United States Patent [19]
Owens, Jr.

[11] 3,869,713
[45] Mar. 4, 1975

[54] SINGLE FIELD VIDEO RECORDING SYSTEM AND METHOD

[75] Inventor: Robert C. Owens, Jr., Palos Verdes Peninsula, Calif.

[73] Assignee: VAS Ltd., Torrance, Calif.

[22] Filed: Nov. 29, 1972

[21] Appl. No.: 310,668

[52] U.S. Cl. .................................... 360/35, 360/22
[51] Int. Cl. ............................................. H04n 5/78
[58] Field of Search ...... 178/6.6 A, 6.6 DD, 6.6 FS; 179/100.2 T, 100.2 D, 100.2 MP; 340/174.1 C; 360/10, 35, 66, 22

[56] References Cited

UNITED STATES PATENTS

| | | | |
|---|---|---|---|
| 3,026,369 | 3/1962 | Lohmann et al. | 178/6.6 DD |
| 3,051,777 | 8/1962 | Lemelson | 178/6.6 DD |
| 3,352,968 | 11/1967 | Walter et al. | 178/6.6 FS |
| 3,548,095 | 12/1970 | Poulett | 178/6.6 DD |
| 3,647,954 | 3/1972 | Booker Jr. et al. | 178/6.6 A |
| 3,649,752 | 3/1972 | Kinjo | 178/6.6 DD |

*Primary Examiner*—Raymond F. Cardillo, Jr.
*Attorney, Agent, or Firm*—Flehr, Hohback, Test, Albritton & Herbert

[57] ABSTRACT

A video recording system for recording single individual fields, one at a time, on a cyclic record medium employs a magnetic transducer element and a cyclically moving record medium disposed in recording relation thereto for recording from a source of composite video signals. An erase pulse is coupled to the transducer for first erasing the medium along the entire length of a track thereof. Then composite video signals are gated from the source thereof to the transducer in response to the conjoint action of both the erase pulse and the first synchronizing timing pulse (derived from the composite video signal) occurring following completion of the erase pulse. The gating means serves to inhibit the gating of composite video signals to the transducer in response to receipt thereof of a second synchronizing timing pulse.

10 Claims, 3 Drawing Figures

SINGLE FIELD VIDEO RECORDING SYSTEM AND METHOD

BACKGROUND OF THE INVENTION

This invention pertains to video recording systems and particularly to a video recording system capable of recording a single video field in isolation of others.

In certain applications such as in medical X-ray situations and in other systems using television as a readout means, it is useful to have a means for storing and replaying portions of the video signal for further study and analysis. For example, to reduce X-ray exposure, X-ray pictures are recorded directly on magnetic discs using video cameras.

In certain circumstances, one "still" picture is played back continuously for intensive study. In standard television format, however, it takes two fields to make a complete picture or frame. These fields occur alternately in time, and thus contain potentially different information. For example, if the subject is in motion or if the brightness level changes during accumulation of the two fields, an annoying motion flutter or brightness flicker will result when the two fields are recorded and played back as one still picture. This occurs whether the frame is part of a continuous, recorded sequence or simply a single stored frame.

As disclosed herein, means are provided for recording a single field in its own associated circular track on a disc whereby upon positioning a transducer to that particular track, the field can be reproduced and examined. The field fills the entire track so as to provide a continuous, uninterrupted signal.

In addition to the above, the system can continuously monitor circumstances being viewed whereby upon viewing a given activity desired to be recorded, a command pulse can be initiated and the scene immediately recorded without any interruption of the continuous monitoring of the activity.

In short, according to the present system, as a continuous stream of composite video is monitored, a single field of video can be snatched from the stream and recorded without interrupting the continuity of the video being monitored and without recording more than a single isolated video field.

SUMMARY OF THE INVENTION AND OBJECTS

In general, a video recording system of a type employing a magnetic transducer element and a rotating record disc is provided for recording a single field taken from a composite video signal so as to be recorded on the disc in one of its several concentric tracks. Means forming an erase pulse coupled to a recording transducer for a predetermined period of time in excess of the period of one revolution of the disc serves to thoroughly erase the disc throughout a closed circular path or track thereof. A gating control means disposed to sense the timing (or sync) pulses of the composite video signal and also the erase pulse serves to gate composite video signals from a source thereof to the recording transducer element for recording upon the disc in a path thereon in response to sensing of the first of the timing signals taken from the video signal occurring after termination of the erase pulse and serving to terminate the gating in response to sensing a second of the timing signals.

In general, it is an object of the invention to provide an improved video recording system and method of a type specially adapted to record individual video fields in associated circular tracks on a rotating record disc.

It is another object of the invention to provide a video monitoring system and method wherein during continuous monitoring of circumstances under surveillance of a video camera, a given field can be taken from the video material being monitored and recorded by itself in an associated record track on a rotating magnetic disc.

The foregoing and other objects of the invention will become more readily evident from the following detailed description of a preferred embodiment when considered in conjunction with the drawings.

DETAILED DESCRIPTION OF A PREFERRED EMBODIMENT

Figure 1:
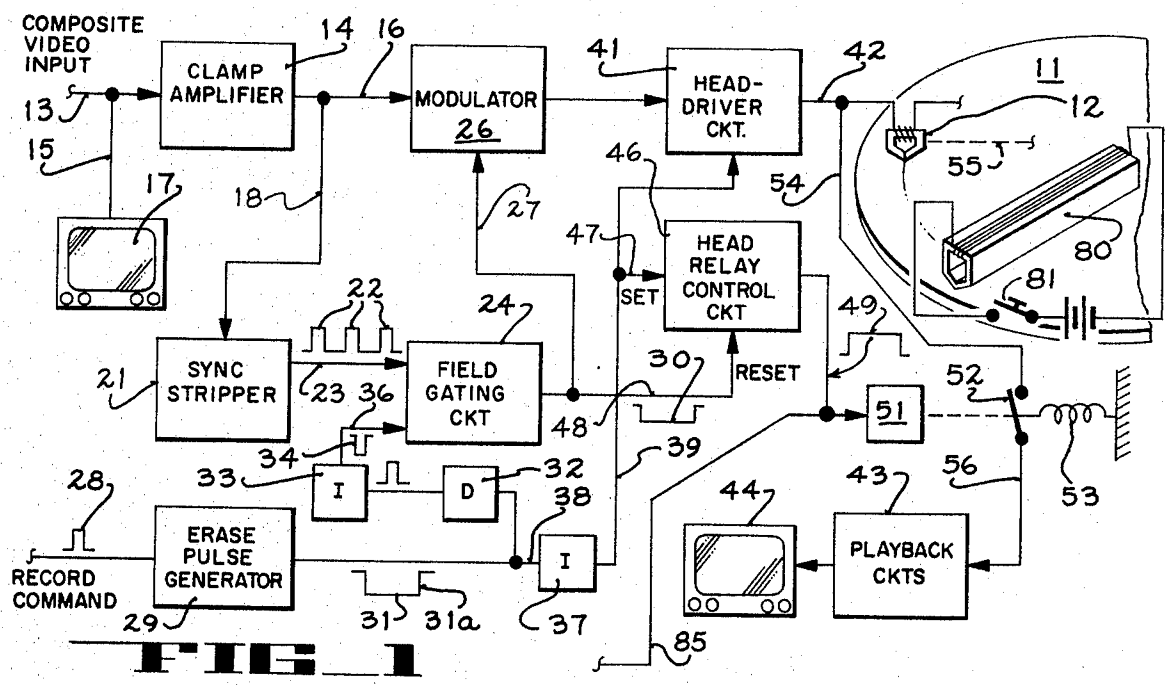
FIG. 1 shows a diagrammatic box diagram system layout of a video recording system of the kind described above.
Figure 2:
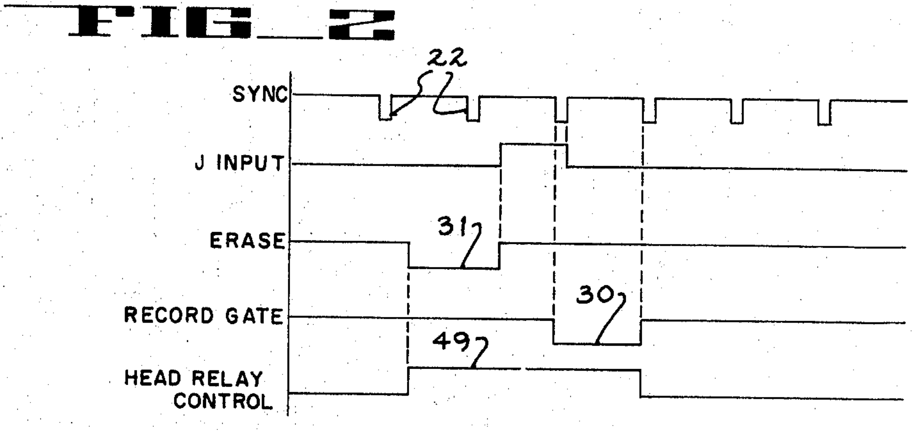
FIG. 2 shows a graph of several wave forms taken from various portions of the system.

The video recording system includes a cyclic record medium, such as a magnetic disc 11, disposed in cooperation with a magnetic recording transducer element 12. A source of composite video signals is shown as the input line 13 leading into a clamp/amplifier circuit 14 of conventional design. Input 13 supplies the composite video signals via line 15 to a television monitor 17 for continuous viewing.

As is known, a composite video signal includes certain synchronizing or timing pulses sometimes referred to as the vertical sync pulse associated with each video field. These pulses are employed for purposes of control in the monitoring or playback of video pictures and, in the present instance, these pulses are also used for gating (or switching) the composite video signals from line 16 through modulator 26 to be recorded at transducer element 12. This gating or switching is effected in the modulator 26 in known style from signals on gating input line 27 as will be explained below.

Figure 3:
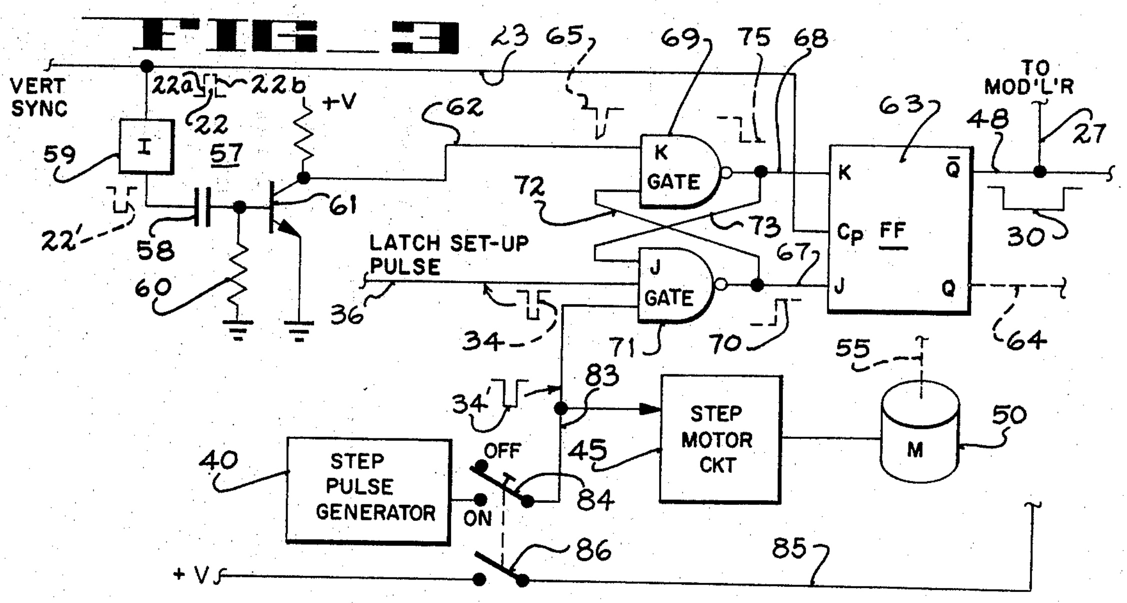
FIG. 3 shows a schematic diagram of a portion of FIG. 1 identified as the field gating circuit 24.

Composite video signals not only appear on line 16 but also on lead 18 coupled thereto for entry into a circuit 21 of conventional design referred to hereinafter as a sync stripper circuit. Circuit 21 serves to remove all but the vertical synchronizing timing pulses 22 from the signal. These vertical sync pulses 22 pass via input 23 to a field gating circuit 24 explained in detail more fully below particularly with respect to FIG. 3.

When it is desired to permit the composite video signals from input 13 to be transmitted to recording element 12, i.e., to be "gated" to element 12, it is necessary to provide a suitable gating signal 30 to modulator 26 via the record gate lead 27.

Field gating circuit 24 is "set" by a suitable record command pulse 28 occasioned by various types of means such as manual or electronic switches capable of generating a suitable control signal.

An erase pulse generator 29 of conventional construction, such as a so-called one-shot circuit capable of generating an output pulse for a predetermined prolonged period of time such as erase pulse 31 shown on lead 38 serves to set field gating circuit 24 and also activate transducer 12 to erase a complete track on disc 11.

Means for differentiating and inverting the trailing edge 31*a* of erase pulse 31 comprises a differentiator 32 and inverter 33 whereby the positive going trailing edge 31*a* is first differentiated at 32 to provide a sharp output pulse which is inverted to provide the negative going record/command pulse 34 on the latch setup lead 36.

Means for providing saturation erasing of the record track which is to be recorded upon includes an inverter circuit 37 directly coupled to erase pulse generator 29 via line 38 whereby the output from inverter 37 appears on line 39 for feeding a prolonged positive pulse into the head driver circuit 41 of conventional design coupled via lead 42 to transducer 12.

The duration of pulse 31 is adjusted so as to exceed the time for a single revolution of disc 11 to insure that the track upon which a field is to be recorded will be completely and thoroughly erased.

Where erasing of the track has been pursued simply by reliance upon the recordation of subsequent signals thereover, it has been observed that, after several recordations have been made in the same location, the reproduction of signals from the track becomes unreliable to the extent that previously recorded video signals thought to have been erased are reproduced partially through the most recently recorded signals.

During both the erasing of a track and recording in that track, the playback circuits will be decoupled from the transducer element 12 by means described below.

It has been observed that by decoupling transducer element 12 from the playback circuits 43 at the time of recording the video field thereon and also at the time of erasing, an improved signal with less distortion is obtained. This, of course, becomes an important consideration where critical examination of the video image is to be made as, for example, in a recorded X-ray application as described at the outset above.

Means for decoupling transducer element 12 from play-back circuits 43 and playback display 44 comprises a head relay control circuit 46 which can, for example, constitute a conventional resettable one-shot pulse generator or a resettable flip-flop either of which would have a setting input 47 and a resetting input 48. Head relay control circuit 46 serves to provide a prolonged signal in the form of pulse 49 for energizing an electronic relay circuit 51 for the period when pulse 49 is positive. Circuit 51 may include, for example, a coil electro-mechanically connected to a switch armature 52 which is spring-loaded by spring 53 to move to a position serving to complete a circuit between lead 54 and lead 56. Lead 56 supplies playback circuits 43 coupled to playback display 44.

Circuit 51 is also operated to continuously hold open the switch armature 52 whenever step pulse generator 40 is coupled by switch 84 in line 83 to provide latch setup pulses 34′ to J gate 71. Thus, a switch 86 ganged together with switch 84 serves to couple a steady state high voltage +V via line 85 into circuit 51 to maintain armature 52 in an open state.

Field gating circuit 24 (FIG. 3) serves to switch an output, $\overline{Q}$, on line 48 to a negative state for a period defined between the leading edge of one vertical sync pulse 22 and the leading edge of the next subsequent sync pulse 22. Gating circuit 24 includes a differentiating circuit portion 57 consisting of the capacitor 58 and resistor 60. Differentiator 57 is coupled to the base electrode of transistor 61 having a grounded emitter and output lead 62 taken from its collector. Line 23 serves to receive the vertical sync pulses 22 and is coupled to the clock pulse input $C_P$ of a so-called JK flip-flop 63.

Flip-flop 63 is of a type whereby a pair of output states or voltage conditions, for example, can be supplied to output leads 48, 64 for representing the states $\overline{Q}$ and Q respectively. Flip-flop 63 is triggered by the edge of a pulse which in the present case is a positive going edge. Thus, in the case of pulse 22, the leading edge is used for triggering flip-flop 63 via input 23 whereby the state of inputs 67, 68 is immediately transferred to the Q and $\overline{Q}$ outputs. Hereinafter, inputs 67, 68 will be referred to as the J, K inputs respectively, and it is to be noted that the Q output lead 64 is shown in dashed lines since it is not used but is shown merely to exemplify the bi-stable nature of flip-flop 63.

The negative going trailing edge 22*b* of pulse 22 serves to reset the states of K and J inputs 68, 67 as now to be described by means of a "latch" circuit.

The latch circuit includes the K gate 69 and J gate 71 of a type constituting NAND gates. These gates utilize conventional rules of NAND gate logic wherein a single negative input to the gate will develop a positive output state and wherein a low or negative output state is developed when the two inputs are both high or positive.

At the commencement of operations, flip-flop 63 may be in either of its two stable states with output Q high or low and output $\overline{Q}$ low or high. Also, the J and K inputs 67, 68 may be either low or high.

However, the latch setup line 36 will normally be in a high state, as will output line 62.

The latch circuit is set by pulse (derived from differentiating and inverting the trailing edge 31*a* of the erase pulse 31 so as to provide the negative pulse 34 on lead 36). This pulse provides a positive stable state 70 on J input 67 due to the rules of NAND gate logic as noted above. Briefly, the logic rules here are that one low input to a NAND gate provides a high output, but for a low output, there are required two high inputs.

The positive state 70 of J input 67, cross-coupled via lead 72, forms an input to K gate 69 and provides a negative stable state 75 on K input 68 due to the normally high state on line 62. Thus, both of the K gate inputs are positive and the K gate input to flip-flop 63 is established as a negative stable state 75 cross-coupled to J gate 71 whereby J input 67 remains positive.

Accordingly, from the foregoing, after a command signal has initiated erase pulse 31, a latch set-up pulse 34 (derived from the trailing edge 31a of erase pulse 31) on line 36 establishes K and J inputs as negative and positive respectively in response thereto. The same states are triggered onto $\overline{Q}$ and Q by receipt of the (positive going) leading edge 22*a* of the next vertical sync pulse 22 on line 23.

Such triggering transfers the J and K states to Q and $\overline{Q}$ respectively as stable states each time flip-flop 63 is triggered.

Obviously, if the J and K inputs 67, 68 have been reversed in the interim, then the Q and $\overline{Q}$ inputs will also be reversed in response to such triggering of flip-flop 63. On the other hand, if inputs 67, 68 are in the same state as when the first clock pulse occurred, or have not been reversed, then the states of Q and $\overline{Q}$ will remain unchanged by subsequent positive going leading edges 22*a* of sync pulses 22 attempting to trigger flip-flop 63.

The trailing edge 22b of the same sync pulse 22 whose leading edge 22a was used to trigger flip-flop 63 is used to "reset" the latch, i.e., reverse the states on J and K inputs 67, 68 so that the reverse states can be triggered onto Q and $\overline{Q}$. Thus, pulse 22 inverted by circuit 59 provides a positive going trailing edge (at 22′) to be differentiated at differentiator 57 and inverted at transistor 61 so as to provide the negative pulse 65 feeding into gate 69. Accordingly, K input 68 takes a positive state which is cross-coupled to form an input to J gate 71. Since line 36 is normally positive, J input 67 is conditioned to a negative state. Negative J input is then cross-coupled to K gate 69 whereby K input 68 will remain high. J and K inputs, as thus reversed to low and high states respectively, are then triggered onto output leads 64, 48 (respectively for Q and $\overline{Q}$) upon receipt of the next positive going leading edge 22*a*, i.e., the next subsequent sync pulse on line 23. The trailing edge of this second sync pulse is differentiated and inverted to supply a negative pulse at K gate 69 but has no effect on K input 68 since K input 68 is already being held in a high state by the low state on cross-coupling 72. (At J gate 71, the other lead 36 is in its normal positive condition and together with the other positive input from K gate output 68 causes J gate output 67 to remain in its low state.)

When Q is negative at lead 48, modulator 26 is gated (in conventional style) to switch composite video through to head driver circuit 41 so as to record the video on disc 11.

Thus, cross-coupling of J gate output 67 to K gate 69 serves to keep a positive output on K gate 69 and this condition will remain until upset by a negative latch set-up pulse 34 which will cause J input 67 to go to a positive state whereby in combination with the normally positive state on K gate input lead 62 serves to condition K input 68 to a negative set state. This negative state serves to hold J input 67 positive (via cross-coupling lead 73) to await the leading edge 22*a* of the next vertical sync pulse 22 so as to start a new recording cycle starting with the triggering of flip-flop 63 so as to transfer the J (positive) and K (negative) input states onto leads 64, 48 as Q, $\overline{Q}$ respectively thereby gating modulator 26 as described above.

With the foregoing system it is possible for an operator to continuously monitor video signals at monitor 17 and, upon observing a particular circumstance desired to be recorded, the operator can manually close a suitable switch of conventional style (not shown) to provide the record command pulse 28 noted above. In this way, individual "exposures" can be recorded on a disc by stepping the transducer 12 from one track to the next between each field which is recorded.

In another mode of operation, a stepping motor 50 provides a mechanical connection indicated by the dashed line 55 to step transducer 12 from one track to the next at a given rate. When a number of video fields are to be recorded in a corresponding number of tracks on disc 11, a bulk erase magnet 80 is simply energized, for example, by closing the switch 81 in circuit with a power supply such as battery 82 and magnet 80 whereby after a revolution of disc 11, all tracks of the recording surface will have been erased thoroughly.

Subsequently, a step pulse generator 40 of suitable known construction initiates a series of pulses 34′ on its output lead 83. These pulses 34′ are fed to the step motor circuit 45 which, in turn, serves to drive motor 50 stepwise to advance head 12 from track to track.

The same pulses 34′ are also fed to J gate 71 and, in view of the fact that pulses 34′ from step pulse generator 40 are negative (as were the set-up pulses 34), the output of J gate 67 is set to a positive stable state 70, all as hereinbefore achieved by means of the latch set-up pulse 34. From this point, the circuitry previously described operates to record a field in each of that number of tracks corresponding to the number of step pulses 34′ generated by step pulse generator 40.

By varying the speed of the output of step pulse generator 40, it is readily evident that by using the same circuitry as above described but with an improved input thereto, transducer 12 can be recording continuously from one track to the next stepping from one track to another only at the end of the recordation of each successive field therein.

From the foregoing, it should be readily evident that there is shown herein a method of recording a single isolated field of video information upon a cyclic recording medium via a magnetic transducer disposed in recording relation to the medium by using the steps of supplying a continuous stream of composite video information to be recorded on the medium via the transducer, monitoring the stream of information while inhibiting passage of the stream to the transducer, then selectively generating a sufficiently prolonged erase signal for controlling the transducer to erase a closed circular path on the medium. A succession of timing signals is then derived from the stream of composite video information. The next step is to gate the stream of video information to the transducer for recording the video information on the medium in response to conjoint occurrence of a predetermined portion of the erase signal and one of the timing signals. Finally, the last step is terminated in response to the next occurring of the timing signals so as to again inhibit passage of the stream of video information to the transducer.

Another method of recording single isolated fields of video information upon each of a number of tracks on a cyclic recording medium via a magnetic transducer disposed in recording relation to the medium includes the steps of supplying a continuous stream of composite video information to be recorded on the medium via the transducer, monitoring the stream of information while inhibiting passage of the stream to the transducer, deriving a succession of timing signals from said stream, generating a number of stepping signals, gating the stream of video information to the transducer for recording the video information on the medium in response to the conjoint occurrence of one of said stepping signals and one of said timing signals, terminating the last named step in response to the next occurring of said timing signals to again inhibit passage of said stream to the transducer and finally advancing the transducer in response to the stepping signal immediately following the terminating step. This mode also makes it possible to record a continuous stream of consecutive video fields on consecutive tracks of the disc if the step pulse generator rate is set at 60 pulses per second. This occurs because the latch (K gate 69, J gate 71) is set by each step pulse so it occurs and reset by the trailing edge of each video sync pulse as it occurs. Thus, the J and K inputs are always high and low respectively at the time of arrival of the leading edge of the video sync pulse whereby flip-flop 63 remains in its set condition (Q high, $\overline{Q}$ low) as long as the step pulses occur at 60 per second (i.e., the same as video sync rate). Thus, there is no need in this situation to terminate the gating step in response to the next occurring of the timing signals.

From the foregoing, it will be readily evident that there has been provided an improved video recording system and method for recording isolated single video fields in assigned tracks on a cyclic record medium.

I claim:

1. In a single field video recording system of a type employing a magnetic transducer element and a rotating record disc disposed in recording relation thereto for recording signals from a source of composite video signals of a type containing synchronizing timing signals occurring at regular intervals to define a field of video signals therebetween, means forming an erase pulse coupled to said transducer for a predetermined period of time in excess of the period of one revolution of said disc and serving to erase said disc throughout a closed circular path thereof, means deriving a control signal from a portion of said erase pulse, gating control means disposed to sense said timing signals and said control signal and serving to gate composite video signals from said source to said transducer element for recording upon said disc in said path in response to sensing of the first and said timing signals occurring after termination of said erase pulse and serving to inhibit said gating in response to sensing a second of said timing signals.

2. A single field video recording system according to claim 1 wherein said second timing signal occurs as the next succeeding timing signal following said first timing signal whereby to limit the period of recording to a single video field.

3. A single field video recording system according to claim 1 of a type having video playback circuits to reproduce recorded signals from said disc via said transducer element comprising switch means for coupling and decoupling said playback circuits from said transducer element, said switch means being operatively coupled to the first named said means and responsive thereto to decouple said playback circuits from said transducer element in response to initiation of said erase pulse, said switch means being further operatively coupled to said gating control means for recoupling said transducer element to said playback circuits in response to said second timing signal.

4. A single field video recording system of a type employing a magnetic transducer element and a cyclically moving record medium disposed in recording relation thereto for recording from a source of composite video signals of a type containing synchronizing timing signals therein, means forming an erase pulse coupled to said transducer for erasing said medium along the entire length of a track thereof, means serving to derive a control signal from a portion of said erase pulse, means serving to gate composite video signals from said source to said transducer under the control of both said control signal and a first synchronizing timing signal of the composite video signal, the last named means serving to inhibit the gating of said composite video signal to said transducer in response to receipt thereof of a second synchronizing timing signal.

5. The method of recording single isolated fields of video information upon each of a number of tracks of a cyclically moving recording medium via a magnetic transducer disposed in recording relation to said medium and having a stepping drive motor for advancing said transducer from track to track on said medium, said method comprising the steps of supplying a continuous stream of composite video information to be recorded on said medium via said transducer, monitoring said stream of information while inhibiting passage of said stream to said transducer, deriving a succession of timing signals from said stream, generating a number of stepping signals independently of the timing signals for advancing the stepping motor to move the transducer from one track to the next, recording said video information on said medium under control of one of said stepping signals while initiating said recording in response to one of said timing signals, terminating the last named step in response to the next occurring of said timing signals to again inhibit passage of said stream to said transducer, and advancing said transducer in response to said stepping signal immediately following said terminating step.

6. The method of recording single isolated fields of video information upon each of a number of tracks of a cyclically moving recording medium via a magnetic transducer disposed in recording relation to said medium and having a stepping drive motor for advancing said transducer from track to track on said medium, said method comprising the steps of supplying a continuous stream of composite video information to be recorded on said medium via said transducer, monitoring said stream of information while inhibiting passage of said stream to said transducer, deriving a succession of timing signals from said stream, generating a number of stepping signals independently of said timing signals for advancing the stepping motor to move the transducer from one track to the next, gating said stream of video information to said transducer for recording said video information on said medium in response to the combined action of a stepping signal and one of said timing signals, and advancing said transducer in response to said stepping signal.

7. A single field video recording system of a type employing a magnetic transducer element and a cyclically moving record medium disposed in recording relation thereto for recording from a source of composite video signals of a type containing synchronizing timing signals therein, means including a modulator for coupling said source to said transducer for recording upon said medium, means forming an erase pulse coupled to said transducer for erasing said medium along the length of a track thereof, means serving to derive a control signal from a portion of said erase pulse, means for deriving a stream of said timing signals from said source, means including a latch circuit disposed to be set and reset respectively by said control signal and a first one of said timing signals, and a bi-stable switch means having two inputs coupled to said latch to receive the output states thereof, said switch means having output states respectively related to the input states thereof and means disposed to respond to one of said timing signals to switch the input states of said switch means to said outputs and to retain the last named condition until said switch means is reset by the next occurring timing signal received by said switch means, the output of said bi-stable switch means serving to operate said modulator to couple and decouple said source to said transducer as it is switched from one state to the other.

8. A single field recording system according to claim 7 further including a step pulse generator serving to set said latch circuit and to step said transducer from track to track at a rate related to the rate of setting said latch and recording said fields.

9. The method of recording a single isolated field of video information upon a cyclically moving record medium via a magnetic transducer disposed in recording relation to said medium, said method comprising the steps of supplying a continuous stream of composite video information signals to be recorded on said medium via said transducer, said composite video information signals including timing signals therein, monitoring said stream of information signals while inhibiting passage of said stream to said transducer, selectively generating and feeding a sufficiently prolonged erase signal to said transducer to erase a closed circular path on said medium, deriving a control signal from a predetermined portion of said erase signal, gating said stream of video information to said transducer for recording said video information on said medium under the conjoint control of said control signal and one of said timing signals, and terminating the last named step in response to another of said timing signals to again inhibit passage of said stream to said transducer.

10. The method of recording a single isolated field of video information according to claim 9 wherein the terminating step comprises terminating the last named step in response to the next occurring of said timing signals to again inhibit passage of said stream to said transducer.

* * * * *